Figure 1:
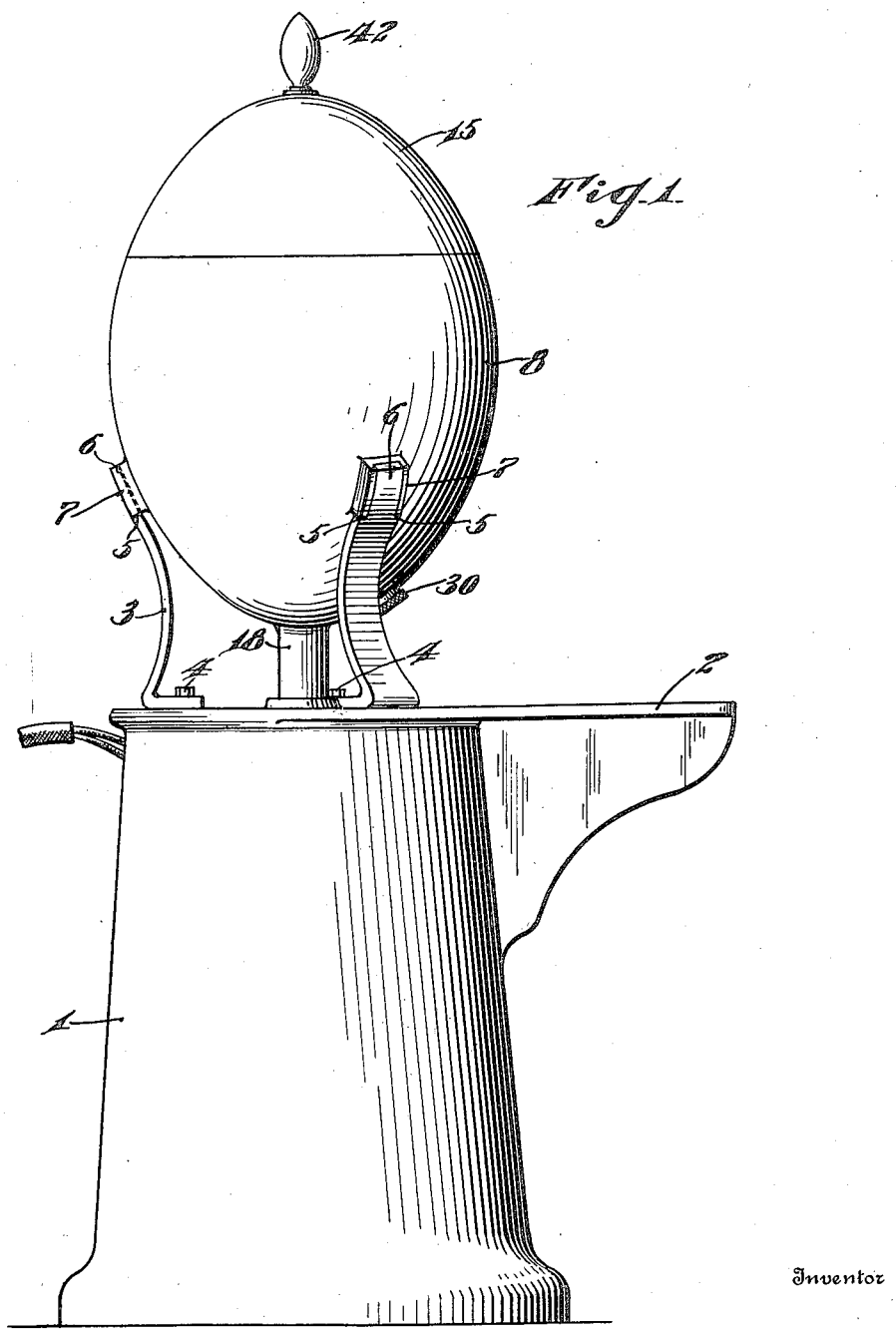

H. F. HALL.
CULINARY MACHINE.
APPLICATION FILED JUNE 23, 1909. RENEWED AUG. 8, 1910.

1,036,489.

Patented Aug. 20, 1912.
5 SHEETS—SHEET 1.

Witnesses
Theo. Rosemann
J. O. T. Marshall

Inventor
Harry F. Hall,
By Joshua R. H. Potts,
Attorney

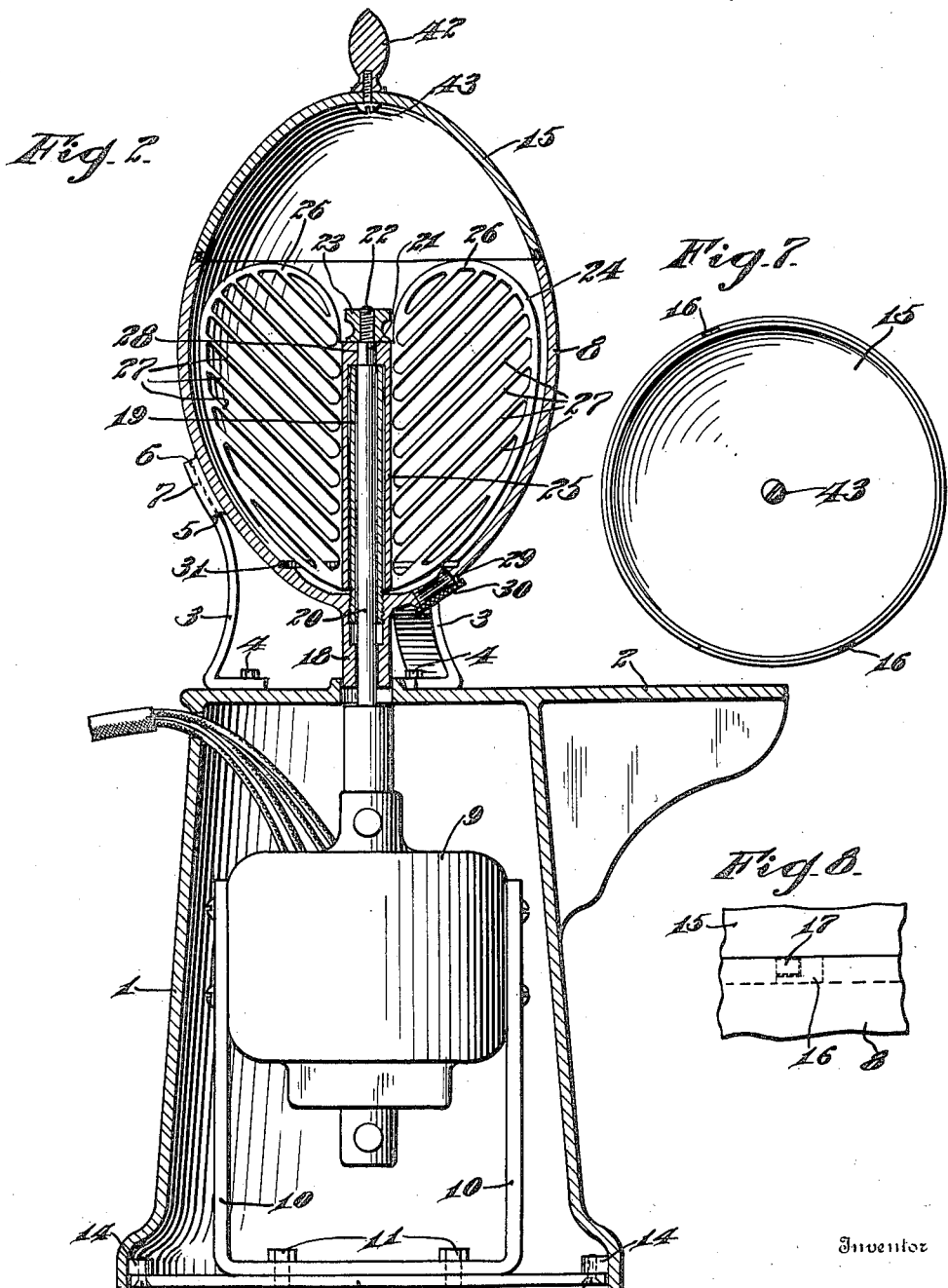

H. F. HALL.
CULINARY MACHINE.
APPLICATION FILED JUNE 23, 1909. RENEWED AUG. 8, 1910.
1,036,489.
Patented Aug. 20, 1912.
5 SHEETS—SHEET 3.
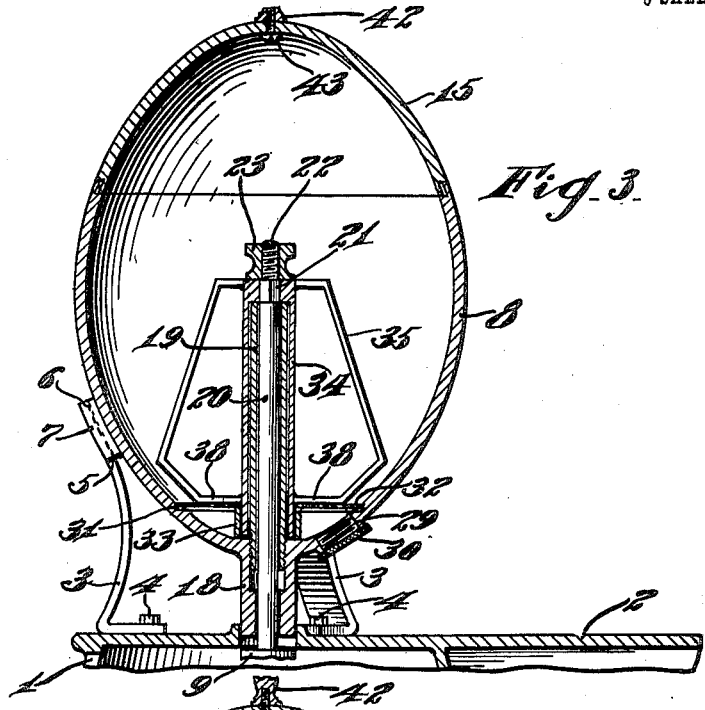
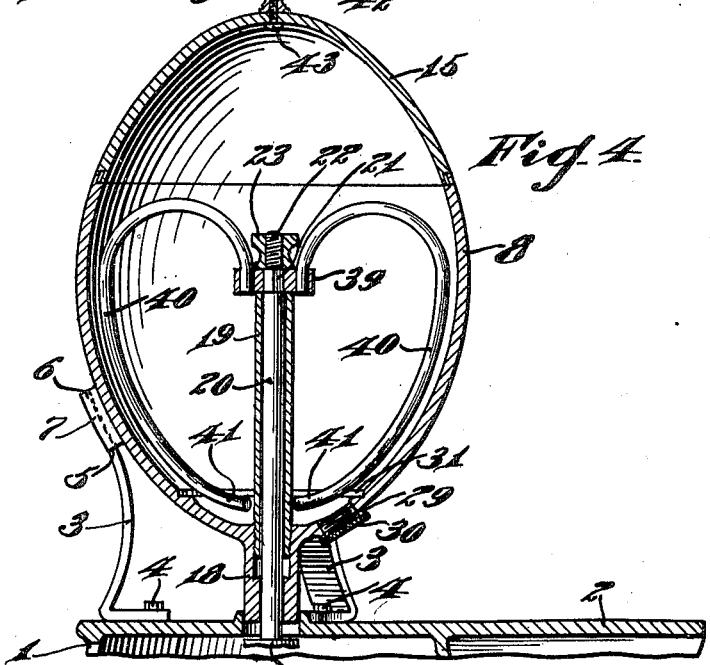
Witnesses
Theo. Risemann
J. P. L. Mulhall.
Inventor
Harry F. Hall,
By Joshua R. H. Potts,
Attorney

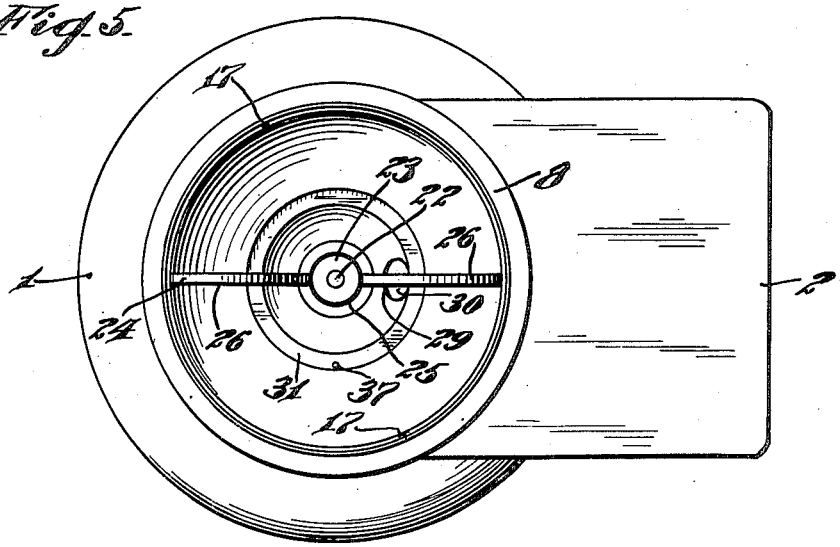
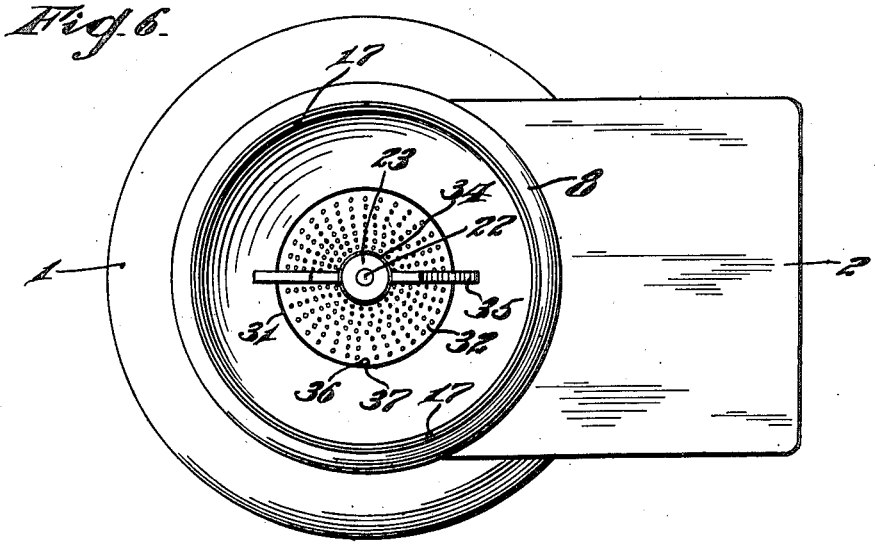

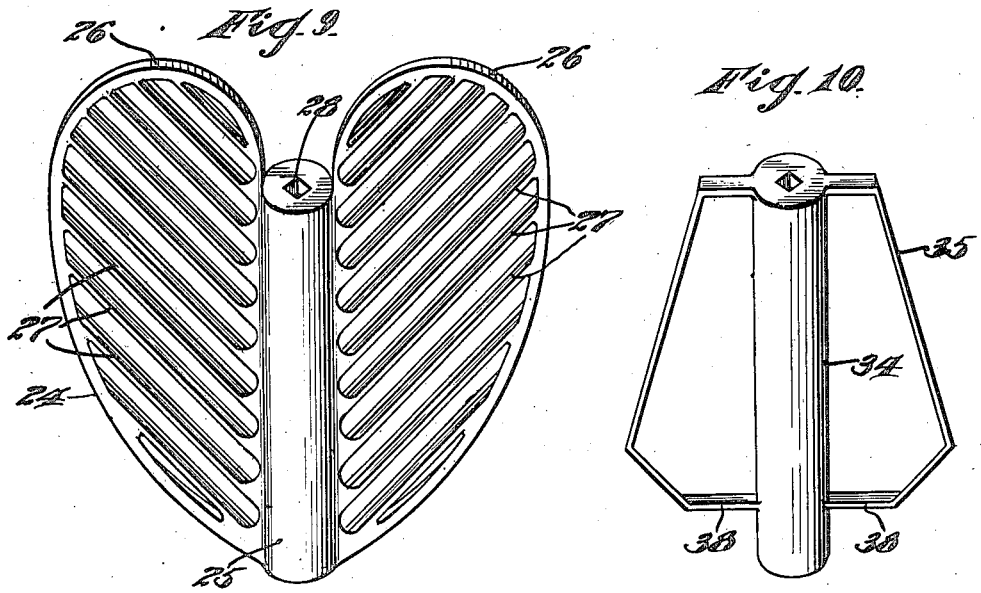
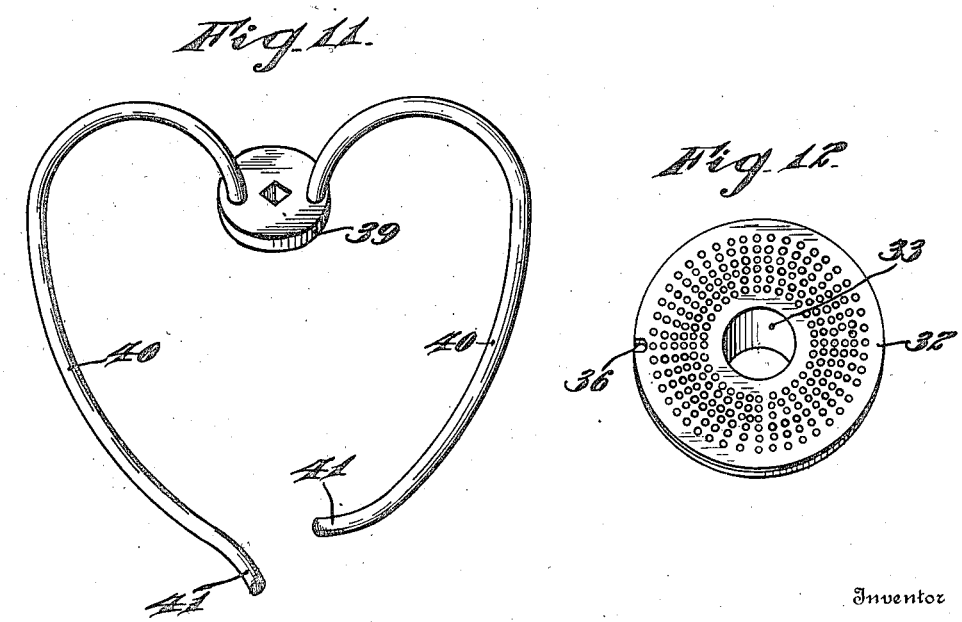

UNITED STATES PATENT OFFICE.

HARRY F. HALL, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

CULINARY MACHINE.

1,036,489.  Specification of Letters Patent.  Patented Aug. 20, 1912.

Application filed June 23, 1909, Serial No. 503,808. Renewed August 8, 1910. Serial No. 576,076.

*To all whom it may concern:*

Be it known that I, HARRY F. HALL, a citizen of the United States, and a resident of Philadelphia, Pennsylvania, have invented certain Improvements in Culinary Machines, of which the following is a specification.

My invention relates to improvements in culinary machines, and more particularly to a machine designed for a great many uses in the kitchen in the preparation of foods, such as mashing potatoes, straining soup, kneading dough, straining fruits, and berries for jellies, beating eggs and for a great many other uses, the object of the invention being to construct an improved machine of this character, with an improved ellipsoidal receptacle, in which whips or beaters are rapidly rotated to throw the materials outwardly and upwardly, by means of a motor, and as will be more fully hereinafter pointed out.

With this and other objects in view, the invention consists in certain novel features of construction, combination and arrangement of parts as will be more fully hereinafter described and pointed out in the claims.

In the accompanying drawings, Figure 1 is a side elevation of a machine illustrating my improvements; Fig. 2, is a sectional elevation of the same; Fig. 3, is a fragmentary view in section, showing the soup strainer and whip in position; Fig. 4, is a view similar to Fig. 3, showing the dough kneader or whip in position; Fig. 5, is a plan view of the device with the cover removed, showing the potato mashing whip in position; Fig. 6, is a view similar to Fig. 5, showing the soup strainer and whip in position; Fig. 7, is an inverted plan view of the cover; Fig. 8, is an enlarged fragmentary view showing the cover locking device; Figs. 9, 10 and 11, are perspective views of the different whips, and Fig. 12, is a perspective view of the strainer.

1 represents a hollow base, having an extension 2 at its upper end, forming a table or platform. A series of curved uprights 3 are secured to the top of base 1 by means of bolts 4, and these uprights are recessed at their upper ends at opposite sides to form shoulders 5 and tongues 6, and when the latter are positioned in the grooved blocks 7, preferably integral with the receptacle 8, such shoulders will limit the downward movement of the receptacle and position the latter in operative relation to an electric motor 9, located in the base 1. The motor 9 is preferably mounted in a bracket 10, secured by bolts 11 to a cross bar 12, said cross bar 12 being secured by screws or bolts 13 to lugs 14 in the base.

The receptacle 8 with its cover 15, form an inclosure of general ellipsoidal shape, which together with the forms of whips employed, impart a distinct advantage to the culinary operations carried on in such inclosure as will be more fully set forth. The cover 15 is provided with a series of L-shaped lugs 16, to engage lugs or pins 17 on the receptacle 8, the parts forming, in effect, bayonet joints and securely locking the cover to the receptacle. When the cover is placed on the receptacle, it is given a partial turn until its lug 16 engages under the lugs 17 of the receptacle to effect locking of the same thereto. This receptacle 8 is provided at its lower end, with a depending tubular extension 18, and an upwardly projecting tube 19 is externally screw threaded at its lower end, and engages external screw threads in the extension 18, to readily hold tube 19 in vertical position centrally inside the receptacle 8. The tubular extension 18 enters an opening in the platform 2 of the base and serves to center and stay said receptacle. This extension 18 and tube 19 are adapted to receive the ordinary motor shaft 20, which latter is made angular near its upper end as shown at 21, and is screw threaded above the angular portion as shown at 22 for the reception of a thumb nut 23 to lock the different whips on the shaft.

Figs. 2 and 9 illustrate a potato mashing whip 24, and while I shall refer to this whip, as the potato mashing whip, it is to be understood that it is designed for a great many uses, such as beating eggs, whipping cream, etc., and I do not confine myself to any particular use for this whip. This whip 24 comprises a central cylindrical bearing sleeve 25, having integral radial vanes 26, which are diagonally slotted as shown, providing a series of inclined spokes 27, the latter being preferably beveled or flattened as illustrated. The upper end of the bearing sleeve 25 is provided with a restricted rectangular opening 28, to snugly fit the angular portion 21 of the motor shaft, and when the thumb nut 23 is screwed home, tightly clamping the whip on the shaft, the motion of the shaft will be transmitted to the whip, as will be readily understood.

When the whip is in operation, the potatoes or other material within the receptacle will be thrown outwardly and upwardly by reason of the shape of the receptacles, and will fall back into center of the receptacle to be again thrown outwardly and upwardly, until the operation is completed. This operation is the reverse of that of ordinary machines, which exert a downward pressure upon the material, and obviates any tendency to compact the materials in the bottom of the receptacle, but insures a light fluffy product.

The receptacle 8 is provided with a discharge opening 29, normally closed by a screw plug 30; such opening being preferably above the table, so that the contents of the receptacle may be directed into a pan (not shown) on the platform whenever the plug 30 is removed, which will be the case in straining soup. On the inner face of receptacle 8 near its lower end, a circular groove 31 is provided, forming a seat or ledge, to receive a perforated plate or strainer 32, which latter is provided with a central sleeve 33, to accommodate the lower end of the central bearing sleeve 34 of the strainer whip 35. This strainer 32 is provided in its edge with a notch 36, adapted to engage over a pin or lug 37 in the grooved portion 31 of the receptacle 8, to lock the strainer against rotary movement. The whip 35 has two open wings or plates of the shape shown in Fig. 10, the lower portion of said plates being horizontal and flat, as at 38, to rub against the strainer, and to free the perforations in the latter of all accumulated material. While this strainer is particularly adapted to straining soup, it is also adapted for straining a great many other fruit stuffs, and I am, of course, not limited in its use.

Fig. 11 illustrates in detail, a dough kneader or whip, comprising a disk 39, having an angular opening therein to receive the angular portion 21 of the motor shaft, and provided with two curved rods or wires 40, having the peculiar compound curvature shown, giving to the lower ends of the rods or wires, what constitutes in effect, fingers 41 which, when the whip is revolved, pick up particles or balls of dough and roll the same against the sides of the receptacle, and upwardly in the receptacle. As the dough will fall back toward the center of the receptacle, the operation is constantly repeated to thoroughly knead the dough.

It will thus be observed, that with my improved machine, all of the whips exert upon the material in the receptacle an outward and upwardly throwing action, which owing to the ellipsoidal shape of the receptacle insures the materials falling back to the center to receive again the same movement, and this operation is continued as long as the whip is revolved by the motor. The whips can be readily changed by simply removing the thumb nut 23, and the whole apparatus can be readily cleansed and maintained sweet and clean without difficulty.

The device may be ornamented in any desired manner, and an ornamental handle 42 is preferably secured to the cover 15 by means of screw 43.

Various slight changes might be made in the general form and arrangements of parts described without departing from my invention, and, hence, I do not restrict myself to the precise details set forth, but consider myself at liberty to make such changes and limitations as clearly fall within the spirit and scope of the claims.

I claim:

1. The combination with a base having an apertured platform and supporting means, of a receptacle of general ellipsoidal form disposed above said base and removably mounted and held against rotary movement, a drive shaft projecting upwardly through the receptacle from said base, a tubular member fixed to said receptacle and surrounding said shaft, a whip disposed within the receptacle and removably mounted on said shaft, and a tubular extension depending from said receptacle and entering the aperture in the platform, said extension serving to center and stay the receptacle.

2. The combination with a base having an apertured platform and supporting means, of an ellipsoidal receptacle removably mounted on said base and held against rotary movement, a drive shaft rotatably supported in the base and projecting upwardly into the receptacle, a tubular member fixed to said receptable and surrounding said shaft, a removable whip secured on the upper end of said shaft, a cover removably secured to the receptacle and conforming in contour to the ellipsoidal shape of the same, and a tubular extension depending from said receptacle and entering the aperture in the platform, said extension serving to center and stay the receptacle.

3. The combination with a base having an apertured platform with supporting means, of an ellipsoidal receptacle removably supported by said base and held against rotary movement, a drive shaft projecting upwardly through the receptacle from said base, a tubular member fixed to said receptacle and surrounding said shaft, a whip disposed within the receptacle and removably mounted on said shaft, a perforated plate forming a screen disposed within the receptacle below the whip, the curved walls of the latter being grooved near the bottom to form a seat for said screen, a projection disposed in said groove, said screen being notched to receive the projection whereby the screen may be held against the rotary movement, said receptacle having a normally closed opening below the groove, and a tubular extension depending from said receptacle and entering an aperture in the platform, said extension serving to center and stay the receptacle.

4. The combination with a base having an apertured platform with supporting means, of an ellipsoidal receptacle removably supported by said base and held against rotary movement, a drive shaft projecting upwardly through the receptacle from said base, a tubular member fixed to said receptacle and surrounding said shaft, a whip disposed within the receptacle and removably mounted on said shaft, a perforated plate forming a screen disposed within the receptacle, the curved walls of the latter being grooved near the bottom to form a seat for said screen, a projection disposed in said groove, said screen being notched to receive the projection whereby the screen may be held against rotary movement, said receptacle having a discharge opening in its wall below the groove, means for normally closing said opening, and a tubular extension depending from said receptacle and entering an aperture in the platform, said extension serving to center and stay the receptacle.

5. The combination with a base having an apertured platform with supporting means, of a receptacle removably supported by said base and held against rotary movement, a drive shaft projecting upwardly through the receptacle from said base, a tubular member fixed to said receptacle and surrounding said shaft, a whip disposed within the receptacle and removably mounted on said shaft, a perforated plate forming a screen disposed within the receptacle, said receptacle being grooved near the bottom to form a seat for said screen, a projection disposed in said groove, said screen being notched to receive the projection whereby the screen may be held against rotary movement, said receptacle having a normally closed discharge opening below the groove, and a tubular extension depending from said receptacle and entering an aperture in the platform, said extension serving to center and stay the receptacle.

6. The combination with a base having an apertured platform with supporting means, upwardly projecting arms, of a receptacle removably supported by said base and held against rotary movement, a drive shaft projecting upwardly through the receptacle from said base, a tubular member fixed to said receptacle and surrounding said shaft, a whip disposed within the receptacle and removably mounted on said shaft, a perforated plate forming a screen disposed within the receptacle below the whip, the walls of said receptacle being grooved near the bottom to form a seat for said screen, a projection disposed in said groove, said screen being notched to receive the projection whereby the screen may be held against rotary movement, said receptacle having a discharge opening in its wall below the groove, a screw plug for closing said opening, and a tubular extension depending from said receptacle and entering an aperture in the platform, said extension serving to center and stay the receptacle.

7. The combination of a base having a platform, an ellipsoidal receptacle removably mounted on said platform, a tubular extension on the bottom of said receptacle having a part of its internal wall threaded, an upwardly projecting tube within the receptacle screwed into said tubular extension, a whip, a central sleeve carried by the whip inclosing said tube and supported thereon, a drive shaft projecting through the receptacle extension and tube and having an angular portion above the tube for engagement with an angular opening in the upper end of the whip sleeve, the end of said shaft being screw threaded, and a nut on said screw threaded end bearing against the end of said sleeve.

8. The combination of a receptacle of general ellipsoidal shape, means for removably supporting and holding said receptacle against rotary movement, and rotating means within said receptacle constructed to throw the contents thereof outwardly and upwardly within the chamber formed by said receptacle, the walls of the latter being so shaped as to direct said contents back to the center of the receptacle for further engagement by the throwing means, and an extension depending from said receptacle and entering an aperture in its supporting means, said extension serving to center and stay the receptacle.

In testimony whereof I have signed my name to this specification in the presence of two subscribing witnesses.

HARRY F. HALL.

Witnesses:
J. A. L. MULHALL,
A. L. WHEATTON.